Figure 1:
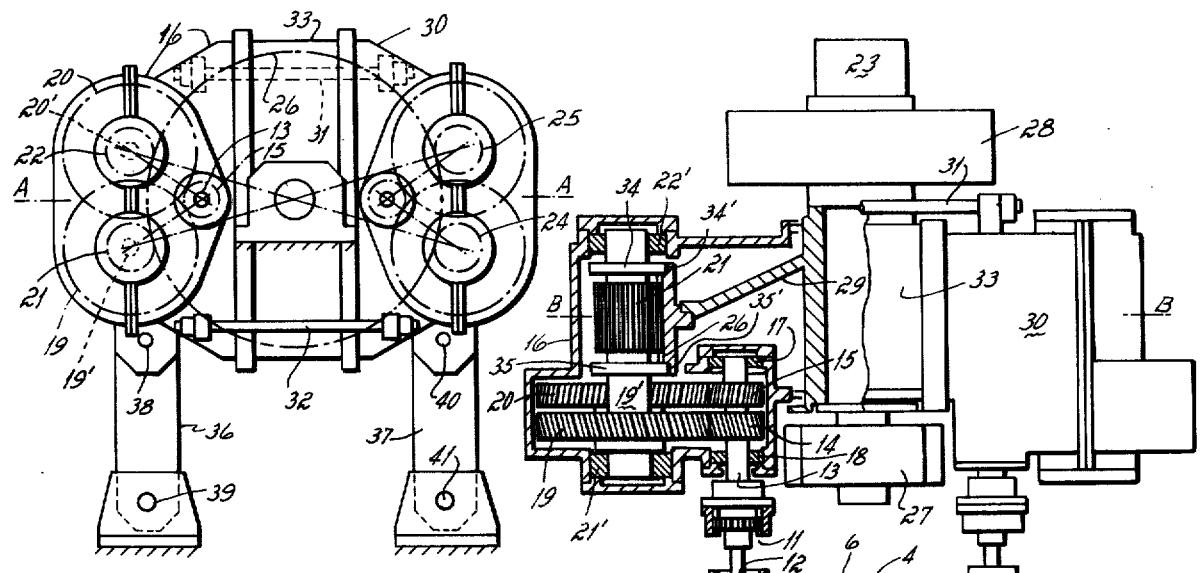

United States Patent [19]
Durand

[11] 3,926,064
[45] Dec. 16, 1975

[54] GEAR TRANSMISSION REDUCTION FOR DIVISION OF POWER

[76] Inventor: Francois Durand, 11 rue du Bateau, 06 Antibes, France

[22] Filed: Jan. 2, 1974

[21] Appl. No.: 430,226

[30] Foreign Application Priority Data
Sept. 21, 1973 France .............................. 73.35920

[52] U.S. Cl. ................ 74/421 R; 74/665 P; 74/413
[51] Int. Cl.²... F16H 1/20; F16H 37/06; F16H 1/06
[58] Field of Search ....... 74/665 P, 413, 414, 421 R

[56] References Cited
UNITED STATES PATENTS

| | | | |
|---|---|---|---|
| 3,151,502 | 10/1964 | Kron et al. | 74/421 R X |
| 3,396,594 | 8/1968 | Walker | 74/665 P X |
| 3,398,596 | 8/1968 | Jahnke | 74/665 P X |
| 3,402,622 | 9/1968 | Archanco | 74/665 P X |

FOREIGN PATENTS OR APPLICATIONS

| | | | |
|---|---|---|---|
| 1,365,123 | 8/1963 | France | 74/665 P |
| 1,261,795 | 7/1960 | France | 74/421 R |

Primary Examiner—Samuel Scott
Assistant Examiner—P. S. Lall
Attorney, Agent, or Firm—Wood, Heron & Evans

[57] ABSTRACT

A gear reduction device that subdivides an input torque to a single input shaft into four separate output torques on four separate drive shafts. The four separate drive shafts each carry a drive pinion, the drive pinions being spaced about and engaged with a single output gear.

7 Claims, 3 Drawing Figures

U.S. Patent   Dec. 16, 1975   3,926,064

GEAR TRANSMISSION REDUCTION FOR DIVISION OF POWER

Whenever mechanical high-torque gear reductions must be fitted into a small space, it is convenient to divide the total power supplied by the drive motor into different effort flow. Later on, these force flows are recombined and conveyed onto a common output shaft.

The objective of the present invention is to present a gear reduction which consists of four reduction trains made with cylindrical gears of parallel axes, in which the input torque is first divided into two secondary torques which are transmitted by the first two gear trains.

Each of these secondary torques is in turn divided in half at the level of a third gear train, and finally the four individual subdivided torques are regrouped on a common output element.

For this purpose, the input shaft, which is connected to the drive motor, has affixed two helical pinions of reversed pitches. This shaft rotates, and it is supported by two radial bearings which permit freedom of movement in the axial direction. The helical pinions mesh with gears that are mounted on two secondary shafts which are located at either side of the input shaft.

In this manner, each of the secondary shafts will transmit 50% of the input torque. These secondary shafts are in turn engaged witth tertiary shafts which have also helical pinions of reversed pitches mounted on them, and are supported by bearings which allow for movements in the axial direction.

The helical pinions of the last mentioned shafts engage with gears mounted on shafts which have pinions rigidly affixed to them. These pinions, finally, mesh with a main output gear onto which they discharge the sum of their individual torques. The main output gear is mounted on an output shaft.

The linkage between the secondary and tetriary shafts may be achieved by using a system of floating shafts which are provided at each end with a universal joint that allows for a certain misalignment to occur between the outputs of the secondary gear trains.

The first two gear trains may also be contained in a housing that is affixed to a rigid foundation. This is relatively easy to achieve since the first two gear trains rotate at high speeds and therefore consist of mechanical elements of small sizes.

On the other hand, the third and fourth gear trains rotate with slower speeds and as a consequence they transmit larger forces and their mechanical elements tend to be heavier and more voluminous. For this reason, it is convenient to provide a floating mounting for those latter elements. This can be achieved by mounting them in independent housings which are linked together by means of connecting rods, and affixed to the ground with articulated bars. These bars would be positioned in the central plane of the gear teeth.

The four pinions which mesh with the main output gear may be provided with rollers located at either side of the teething of the pinions and concentric with their axes. These rollers would move along tracks carved on the sides of the main output gear, and they would control in this manner the radial and axial movement of each pinion with respect to the main gear.

In order to minimize the general size of the gear reduction it would be convenient to use hollow shafts for the output of the secondary gear trains or for the input of the tertiary gear trains. The floating shafts would then pass through these hollow shafts.

Figure 2:
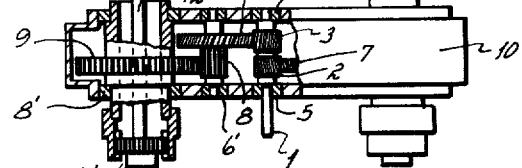
Figure 3:
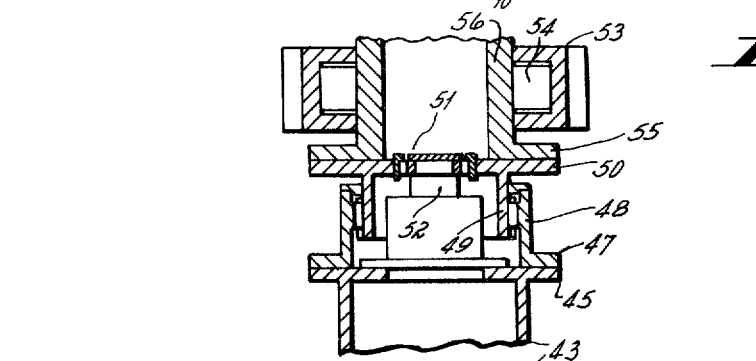
Figure 3:
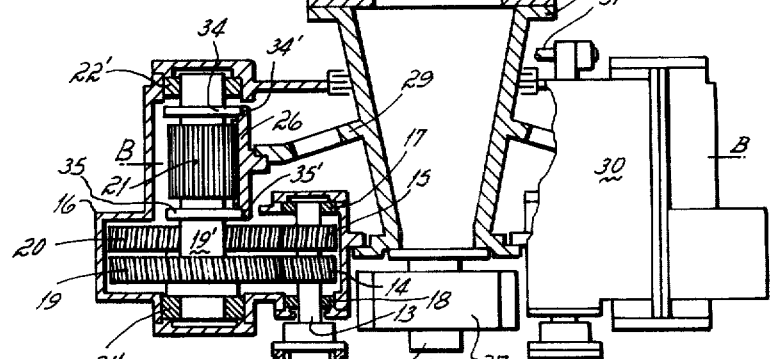

As an example, the FIGS. 1, 2 and 3 show a front view and a top view of a gear reduction according to the present invention.

The input shaft 1 carries the pinions 2 and 3 which have helical teeth and reversed pitches. The shaft 1 is supported by the radial bearings 4 and 5. The pinion 3 meshes with the gear 6 while the pinion 2 meshes with the gear 7. The gears 6 and 7 are located horizontally at both sides of the shaft 1. In this manner, the gear reduction is perfectly symmetrical in relation to the shaft 1 and it becomes necessary for the purpose of this relation to describe only the kinematic chain which begins with the pinion 3, since 50% of the power will be transmitted through the gear 6 and the other 50% through the gear 7.

The pinion 8, which is rigidly attached to the gear 6, meshes with the gear 9. The elements 6, 8 and 9 and their similar counterparts located at the other side of the shaft 1 rotate within the housing 10 onto which they are affixed by means of suitable axial and radial bearings 6', 8'. The gear 9 is linked to the shaft 13 by means of the gear couplings 10' and 11, and of the shaft 12. This shaft 13 has affixed to it the helical pinions of reversed pitches 14 and 15, and rotates within the housing 16 to which it is secured by means of the radial bearings 17 and 18. At each side of the shaft 13 in the vertical direction, the pinion 14 meshes with the lower gear 19, while the pinion 15 meshes with the upper gear 20 (FIG. 1). The gear 19 has rigidly attached to it the pinion 21 on shaft 19'. In the same manner the gear 20 and the pinion 22 are rigidly attached to each other on shaft 20'. The shafts 19', 20' are carried by housing 10 by suitable radial bearings 21', 22'. In such a way, each of the pinions 21 and 22 transmit 50% of the torque carried by the shaft 13 and, therefore, 25% of the total input drive torque.

At the other side of the output shaft 23, in the horizontal direction, the pinions 24 and 25 each transmit likewise 25% of the input drive torque, and the four pinions 21, 22, 24 and 25 recombine their respective torques on the output gear 26. This output torque is then conveyed to the machine activated by the output shaft 23, which rotates and is supported by the bearings 27 and 28, see FIG. 2.

The housings 16 and 30, which are symmetrically positioned at either side of the shaft 23, are connected together by means of the connecting rods 31 and 32 which are equidistant from the center line A—A. A hood 33 interposed between the housings 16 and 30.

Each of the pinions 21, 22, 24 and 25 is provided with rollers 34 and 35 located at either side of the teething - these rollers slide along guides 34', 35' located on the main output gear 26.

The lengths of the connecting rods 31 and 32 as well as those of the bars 36 and 37 are determined in such a way as to allow for a small play to exist between the rollers 34 and 35 of the pinions 21, 22, 24 and 25, and the guides of the main gear 26.

The bars 36 and 37 are linked to the housings 16 and 30 and to the ground by means of the hinges 38, 39, and 40, 41. The force lines that pass through the articulations 38, 39 and 40, 41 are positioned on the median plane of the gear teeth B—B.

In certain cases, the shaft 23 may coincide directly with the axle of the driven machine. The main gear 26 and its hub 29 are then an integral part of that driven machine. In this case, the bearing 28 is superfluous since the gear reduction is attached directly to the machine and the bearing 27 acts not only as a bearing but also as a hinge. This bearing is mounted, in such a case, on a shaft which is attached to the hub of the low speed gear. The hub is affixed to a tube at whose end another shaft is attached to a hinge which is supported by a plate that is connected to the shaft of the driven machine. The tube of the gear hub and the shaft of the machine are linked together by a universal joint which allows them to be set at different angles with respect to each other.

In FIG. 3, the universal joint 27 supports the shaft 42 which is affixed to the hub 29 of the main gear 26. The tube 43 with its flanges 44 and 45 is attached at one end to the flange 46 of the hub 29, and at the other end to the flange 47 which belongs to the inner gear 48 of a gear coupling. The outer gear 49 of that same gear coupling has a flange 50 onto which is affixed the universal joint 51 which holds the shaft 52. This shaft is in turn attached to the flange 45. The flange 50 is affixed onto the flange 55 which is attached to the shaft 56 of the driven machine. This shaft is supported by the bearing 53 through the universal joint 54. It is easy to see in this example that it is possible to avoid using the bearing 28 and the shaft 23 depicted in FIG. 2.

Having described the preferred embodiment of my invention in detail, what I desire to claim and protect by Letters Patent is:

1. A gear reduction device for driving a single output gear at four spaced locations about the output gear's periphery from a single input shaft, said device comprising first and second gear shafts, each of said first and second gear shafts being connected through a gear with said input shaft such that the power input to said input shaft is equally divided between said first and second gear shafts, two helical pinions of reverse pitches mounted on each of said first and second gear shafts, a pair of drive gear shafts connected with each of said first and second gear shafts through respective pairs of said pinions carried on said first and second gear shafts, one of said pair of pinions on said first gear shaft being adapted to drive one of each pair of said drive gear shafts associated with that first gear shaft and the other of said pair of said pinions on said first gear shaft being adapted to drive the other of that same pair of said drive gear shafts associated with that same gear shaft, and one of said pair of pinions on said second gear shaft being adapted to drive one of each pair of said drive gear shafts associated with that second gear shaft and the other of said pair of pinions on said second gear shaft being adapted to drive the other of that same pair of said drive gear shafts associated with that same second gear shaft, said connections being such that the power input to each pair of said drive gear shafts from each of said first and second gear shafts is equally divided therebetween, and a pinion drive gear fixed to each of said drive gear shafts, all four of said pinion drive gears being simultaneously meshed with said single output gear, said device initially subdividing an input torque into four equal and separate torques, and subsequently regrouping those torques on said single output gear continuously during operation of said device.

2. A device as set forth in claim 1 wherein said single input shaft carries at least two helical pinions of reverse pitches, one of said pinions being adapted to drive said first gear shaft and the other of said pinions being adapted to drive said second gear shaft.

3. A device as set forth in claim 2 wherein the axes of said gear shafts are all parallel one to the other.

4. A device as set forth in claim 1 including a first housing independent of said output gear, said first housing carrying a portion of said first and second gear shafts, and said first housing also carrying said input gear, a second housing for said drive gear shafts, said second housing also carrying a portion of said first and second gear shafts, and said second housing being independent of said first housing, and a gear coupler interconnecting that portion of each first and second gear shaft carried by said first housing with that portion of that same gear shaft carried by said second housing.

5. A device as set forth in claim 4 wherein said second housing comprises two subhousings, each subhousing being sized to enclose one pair of said drive gear shafts, and each subhousing also carrying the analogous portion of said first or second gear shafts.

6. A device as set forth in claim 5 wherein each subhousing is supported relative to ground by a bar articulated at one end of said subhousing and articulated at the other end to a bracket fixed to ground, and wherein said subhousings are maintained in operational relation with said main gear by connecting rods that interconnect same together, said articulated bars and connecting rods permitting restricted peripheral movement between said pinion drive gears and said main gear.

7. A device as set forth in claim 1 wherein said drive gear is directly connected to a machine adapted to be driven by said device, said direct connection being by means of a universal type joint.

* * * * *